United States Patent
Kopko

[11] Patent Number: 5,974,822
[45] Date of Patent: Nov. 2, 1999

[54] ROTATING DISK EVAPORATIVE COOLER

[76] Inventor: William L. Kopko, 5207 Lonsdale Dr., Springfield, Va. 22151

[21] Appl. No.: 08/933,946
[22] Filed: Sep. 19, 1997
[51] Int. Cl.⁶ .................................................... F25D 5/00
[52] U.S. Cl. ................................ 62/310; 62/121; 62/305; 261/83
[58] Field of Search .......................... 62/121, 304, 310, 62/314, 305; 261/83, 127, 151, 140.1

[56] References Cited

U.S. PATENT DOCUMENTS

| | | | |
|---|---|---|---|
| 1,570,354 | 1/1926 | Kasley | 62/310 |
| 1,786,200 | 12/1930 | Ferguson | 261/83 |
| 2,042,087 | 5/1936 | Best | 62/310 |
| 2,841,369 | 7/1958 | Carraway | 62/314 |
| 3,052,105 | 9/1962 | Bowman et al. | 62/305 |
| 4,676,071 | 6/1987 | Latimer | 62/225 |
| 5,435,382 | 7/1995 | Carter | 165/110 |
| 5,661,984 | 9/1997 | Durrell et al. | 62/304 |

FOREIGN PATENT DOCUMENTS 1038636  9/1978  Canada ................................. 62/310

Primary Examiner—William Doerrler
Attorney, Agent, or Firm—Lorusso & Loud

[57] ABSTRACT

A tank holds a pool of liquid coolant in which spaced, rotatable disks are partially submerged. An air flow is established over exposed portions of the disks, preferably parallel thereto, whereby coolant adhering to the disks upon rotating out of the coolant pool is partially evaporated and the disks and remaining adhering coolant have their temperature lowered and serve to cool the coolant pool upon reentry into the pool from the air space above. A fluid to be cooled is passed through tubes mounted in the tank, below the surface of the liquid coolant, parallel to the surfaces of the disks. Adjacent rows of tubes define spaces therebetween, each of which receives the submerged portion of at least one disk. The evaporative cooler may be used in a refrigeration apparatus in combination with a compressor and an evaporator.

15 Claims, 6 Drawing Sheets

ROTATING DISK EVAPORATIVE COOLER

BACKGROUND OF THE INVENTION

1. Field of the Invention

This invention is a new type of evaporative cooler for air-conditioning and refrigeration.

2. The Prior Art

There are three basic kinds of condensers in air-conditioning and refrigeration: air-cooled, water-cooled, and evaporatively cooled.

The most common kind of condenser is air-cooled which residential and smaller commercial equipment use almost exclusively. These condensers typically consist of a coil of copper tubing with refrigerant inside and aluminum fins on the outside of the tubes. A fan blows air over the coil to reject heat to the atmosphere. This type of condenser is simple and requires little maintenance, but is relatively inefficient.

Water-cooled condensers are the second most common type. Water-cooled condensers are typically used with centrifugal and screw chillers found in large commercial and industrial locations. The normal arrangement is a shell-tube heat exchanger with cooling water circulating inside tubes and condensing refrigerant on the outside. The water for this type of condenser is normally cooled by a separate cooling tower. A cooling tower consists of a water spray system that distributes water over a fill material. A fan moves air over the wet fill to cool the water. This system is normally more energy-efficient, with condensing temperatures 20 to 30 degrees Fahrenheit lower than a comparable air-cooled condenser. On the other hand water-cooled condensers and associated cooling towers normally require much more maintenance, are more complicated, and must be assembled in the field rather than shipped as single package.

The third type of condenser is evaporatively cooled. An evaporative condenser combines a water-cooled condenser and a cooling tower into a single package. Existing evaporative condensers are typically found in large commercial or industrial refrigeration systems and are only rarely used in air-conditioning applications.

FIG. 1 shows a typical arrangement for the third type, i.e. an evaporative condenser. A pump 10 draws water from a sump 12 and delivers it to a spray header 15 from which it is sprayed over tubes 14 containing condensing refrigerant. A fan 16 moves air entering at C through the water spray and wet tubes 14 to remove heat therefrom by evaporation. The air exiting the condenser at D goes through a mist eliminator 18 that removes most of the water droplets. While FIG. 1 illustrates a blow through type evaporative condenser, a draw-through type evaporative condenser, wherein the fan is located downstream of the tubes and draws the through the tubes and spray, is also known in the art.

The water pump and spray piping of a system such as shown in FIG. 1 create two major maintenance problems. First they are vulnerable to freezing damage. A partial solution to this problem is to place the sump and pump inside a heated building, but this arrangement makes installation more difficult. The second problem is that the pump and piping can easily clog with dirt. Water strainers are used to reduce this problem, but they too can clog and require frequent maintenance.

Current evaporative condensers and cooling towers have also had significant problems as sources of Legionnaire's disease, a potentially fatal type of pneumonia. Without regular water treatment, the warm, wet conditions in the condenser can support growth of legionella, the bacteria that cause Legionnaire's disease. While legionella are common in freshwater ponds and other surface waters, they do not cause pneumonia unless they are inhaled into the lung. A real problem with conventional evaporative condensers and cooling towers is that the water spray creates a mist of water droplets that can be easily inhaled. Evaporative condensers have been implicated in several outbreaks of Legionnaire's disease.

Evaporative condensers and cooling towers have inherent efficiency advantages compared with air-cooled equipment. For air-cooled equipment the limiting air temperature is the outdoor dry-bulb temperature. For evaporative systems, on the other hand, the limit is the wet-bulb temperature which can be 20 to 40 F. cooler. In addition, heat transfer between air and a wet surface is several times higher than that for a dry surface. The air flow requirements are also smaller with evaporative heat exchange, since the water vapor greatly increases the enthalpy (energy content) of the air. These factors mean that an evaporative condenser or cooling tower can give much lower condensing temperatures while reducing size and fan-energy requirements compared with air-cooled systems.

Despite the better efficiency of evaporative heat exchange, there has been a gradual movement away from water-cooled condensers and evaporative condensers. Early residential air-conditioning systems in the 1930's were normally water-cooled, whereas since the 1950's they have been almost exclusively air-cooled. Cooling loads of 150 tons were normally handled with a water-cooled chiller in the 1960's are now usually serviced with air-cooled equipment. These changes are driven by concerns about maintenance costs associated with water-cooled equipment.

Theoretical analysis and simulation of evaporative condensers, cooling towers, and fluid coolers have been performed by Webb and Villacres, "Performance Simulation of Evaporative Heat Exchangers—(Cooling Towers, Fluid Coolers and Condensers)." *AIChE Heat Transfer Symposium*, vol. 80, 1984. The theoretical basis is well-established, and their simulation predicted heat load within ±3% for a wide variety of air inlet conditions. Moreover, several papers exist which attempt to determine the energy saving potential of evaporatively-cooled condensers. Guinn and Novell "Operating Performance of A Water Spray on an Air-Type Condensing Unit," *ASHRAE Transactions*, vol. 87, part 2, 1981, reported tests on a commercially available water spraying device on the air-cooled condensing unit of a three ton split system air conditioner. They found that the compressor power input decreased by 5% to 9%, the cooling capacity increased by 4.4% to 8.8%, and that the energy efficiency ratio (EER) of the system was improved by 12% to 19% depending upon the thermodynamic state of the inlet air. The sprayer used 51.5 liters of water per hour. Problems encountered were water runoff from the tubes and fouling and corrosion of the tubes. Markoski, M. J. "Exergetic Analysis of Water Spray Augmentation of Air Cooled Condensers," *Proceedings of 19th Intl. Congress of Refrigeration*, IIIa, 1995, provides a brief exergetic analysis of this method of heat transfer augmentation. Leidenfrost, W., and B. Korenic, "Evaporative Cooling and Heat Transfer Augmentation Related to Reduced Condenser Temperature", *Heat Transfer Engineenng*, vol. 3, 1982, tested evaporative cooling for reducing condenser temperatures. Their analytical model was shown to be in agreement with the experimental data. One interesting test showed that, with the condenser heat rate held constant at 300 W (1024 Btu/h), the condensing temperature could be lowered from 44.6° C. (112.3° F.) with dry surfaces to 24.4° C. (75.9° F.)

with wet surfaces. Also, the same data set showed that for a constant condensing temperature, the condenser heat could be increased from 300 W (1024 Btu/h) to 2280 W (7780 Btu/h) when applying the water spray. Although the increase in heat removal rate is partially offset by increased air pressure drop, the net effect is still very positive, with a stated possible decrease in air conditioner power consumption of 50%.

SUMMARY OF THE INVENTION

Accordingly, it is an object of the invention to reduce or eliminate problems associated with the prior art evaporative coolers and to provide an evaporative cooler more competitive with air-cooled equipment.

Another object of the present invention is to save energy by reducing compressor power required for a refrigeration cycle using an evaporative cooler in accordance with the present invention as a condenser.

In order to achieve the foregoing objectives the present invention provides a pool of liquid coolant with the upper surface of the pool in contact with air. A rotatable shaft is mounted above the upper surface of the pool with its longitudinal axis approximately parallel to the upper surface of the pool and is driven for rotation by any suitable rotary drive means. At least one wheel member is mounted on and radially extends from the rotatable shaft and is partially submerged within the pool. Thus, as the wheel member is rotated a given point thereon, in succession, enters the pool, exits the pool into the air and reenters the pool continuously, in a repeating cycle, as the shaft is rotated. In this manner, liquid coolant from the pool clinging to the wheel is evaporated into the air upon leaving the pool and entering the air, thereby cooling the wheel and remaining adherent liquid coolant thereon. The cooled wheel and remaining adherent liquid coolant, in turn, serve to cool the pool upon reentry.

The present invention may be used to cool any body of liquid such as a swimming pool, with or without a fan, establishing an air flow over that portion of the wheel member exposed to the air above the upper surface of the pool, e.g. a swimming pool. However, as will be explained below, the presently preferred application for the present invention is use as an evaporative condenser in a refrigeration system.

The presently preferred embodiment has a plurality of wheel members, e.g. disks, spaced along the rotatable shaft which is mounted above a tank of liquid coolant, e.g. water, the disks extending approximately perpendicular relative to the surface of the pool of coolant and partially submerged therein. A flow of air is provided by a fan and is directed over the portions of the disks extending above the pool of coolant to evaporate coolant and to thereby cool that portion of the coolant which remains adhering to the disks as they reenter the coolant pool. The air flow is preferably directed parallel to the surfaces of the rotating disks. Rows of tubes are mounted within the tank, below the surface of the coolant pool, and are oriented parallel to the surfaces of the rotating disks with one rotating disks extending into each space defined between adjacent tube rows. While the main use for such an embodiment would be as a condenser, it could also be used to cool other fluids besides condensing refrigerant. For example, water or antifreeze solutions could be circulated through the tubes.

As noted above, the presently preferred use of the evaporative cooler of the present invention, is a refrigeration system. In such a refrigeration system a refrigerant, at least partially in the vapor state, is fed by a compressor through the evaporative cooler for condensation therein. The liquefied refrigerant is then passed through an evaporator for cooling a compartment containing the evaporator and returned at least in part in a vapor state to the compressor.

The evaporative cooler of the present invention has the following advantages compared to conventional evaporative condensers:

1) no water pump or spray system to clog or freeze,
2) greatly reduced splashing - virtually eliminates risk of transmitting legionella,
3) reduced maintenance,
4) low cost, and
5) thermal mass of water in tank improves part-load efficiency.

The advantages of the cooler of the present invention compared to air-cooled condensers include:

1) much better energy efficiency,
2) reduced peak power consumption, and
3) competitive cost and size.

The wheel members may be either flat, solid disks or corrugated disks and will typically have a diameter/thickness ratio of 30:1–50:1.

Based on experimental data obtained by the inventors, it is believed that a film of coolant, adhering to the rotating wheel members as they emerge from the liquid coolant and remaining thereon as they reenter the liquid coolant, serves as the primary heat transfer medium.

The present invention further contemplates a method for evaporative cooling using the novel apparatus of the present invention.

DESCRIPTION OF THE PREFERRED EMBODIMENTS

Figure 2:
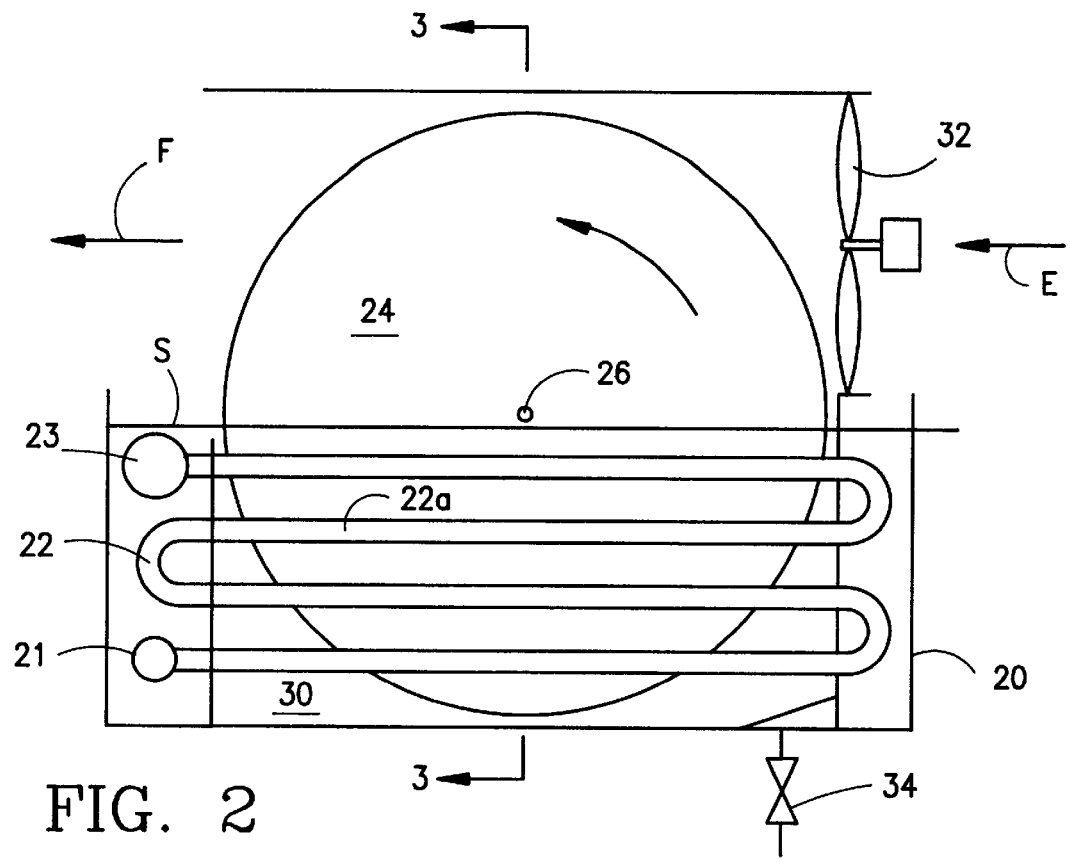
FIG. 2 is a schematic side view of a preferred embodiment of the evaporative cooler of the present invention.
Figure 3:
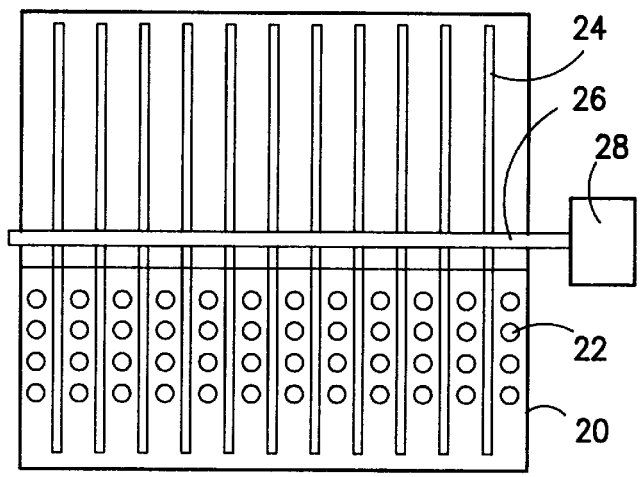
FIG. 3 is a front view in cross-section taken along line G—G in FIG. 2.

A preferred embodiment of the present invention is shown in FIGS. 2–3 wherein a tank 20 has a plurality of rows of refrigerant-containing heat exchange tubes 22 mounted therein. Each row consists of a single tube 22 connected by T-connections between a liquid header 21 and a vapor header 23, e.g. from a compressor. Each tube 22 is bent to form plural horizontal runs 22a which are vertically arranged. A plurality of plastic heat exchange disks 24 are mounted evenly spaced on a rotatable shaft 26 driven by a motor 28. The heat exchange discs 24 each extend between adjacent rows of the heat exchange tubes 22 and are partially submerged in water 30 with their centers located on the rotatable shaft 26, just above surface S of water 30. Air is drawn into tank 20 at E and exhausted at F by a fan 32.

Thus, an air flow path is defined between the top of tank 20 and the surface S of the water 30. In passing through the tank 20 the air increases its moisture content by evaporating liquid water adhering as a film to the surfaces of disks 24. The heat transfer from the disks 24 to the water in the adhering film, as heat of vaporization, serves to cool the disks 24 and, perhaps more importantly, the water remaining in the adhering film. The portions of the disks 24 above the surfaces of the water 30 and remaining water film are directly cooled and serve to cool the water 30 by reentry into the water 30 by rotation and by heat transfer to submerged portions. The water 30 is thereby maintained at a temperature sufficiently low to effect condensation of refrigerant vapor entering tubes 22 submerged in the water 30 contained in tank 20.

Figure 4:
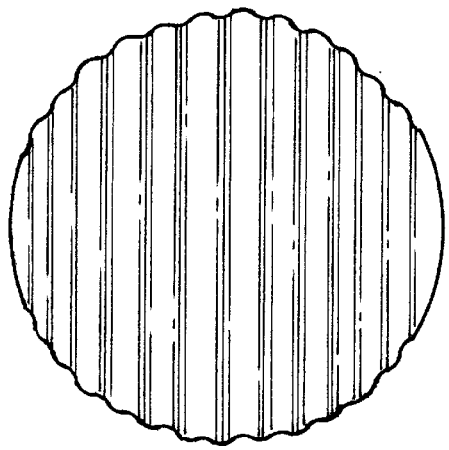
FIG. 4 is a schematic view of a corrugated disc used in an alternative embodiment of the present invention.

In addition to removing heat from the water 30, the rotating disks 24 stir the water. Stirring the water promotes good heat transfer between the water and the condenser tubes 22.

choosing the disk material is cost. A corrugated plastic material (FIG. 4) is the preferred choice from the viewpoint of economics.

Instead of solid circular disks, presenting smooth, uninterrupted surfaces, the disks may have radially extending slits to improve stirring of the water. However, experiments have shown little improvement in performance with a substantial increase in power required to rotate the disks.

Further, instead of corrugated disks (FIG. 4) or flat disks (FIGS. 2–3), circular bodies of a rectangular grid material such as found in fluorescent light diffusers might be used with air flow parallel to the axis of rotation of the disks. However, experiments with such rotating grids showed a large amount of splashing and increased power required to rotate the disks. There also appeared to be problems with maintaining a water film on the disk material.

Instead of counterclockwise disk rotation, direction of disk rotation with respect to the air flow may be reversed. However, while the direction of disk rotation does not make much difference in heat transfer, the air-side pressure drop is much higher when disk rotation is against the air flow. Accordingly, rotation of the disks in the same direction as air flow is preferred.

Experiments show that the power required to turn the disks increases rapidly with rotational speed. Heat transfer improved only slightly above about 20 revolutions per minute (rpm). The optimum speed for the two-foot diameter corrugated disks used in the tests is roughly 20 to 30 rpm.

Table 1 below shows typical operating parameters for the evaporative condenser of the present invention and for a conventional air-cooled condenser.

TABLE 1

Performance Comparison Between the Rotating-Disk Evaporative Condenser and a Conventional Air-Cooled Condenser

|  | Air-Cooled Condenser | New Condenser |  |
|---|---|---|---|
| Ambient Dry-Bulb Temp. | 95 | 95 | deg. F. |
| Ambient Wet-Bulb Temp. | 75 | 75 | deg. F. |
| Condensing Temperature | 120 | 90 | deg F. |
| Condenser Heat Rejection | 31520 | 29027 | Btu/hr |
| Condenser Air Flow Rate | 2500 | 1500 | CFM |
| Ambient Air Enthalpy |  | 38.6 | Btu/lbm |
| Leaving Air Enthalpy |  | 42.9 | Btu/lbm |
| Air Enthalpy at Condensing Temp. |  | 56.0 | Btu/llbm |
| Overall UA/disk |  | 35 | lbm/hour/disk |
| Heat Rejected per Disk |  | 534 |  |
| Disks Required |  | 54 |  |
| Disk Speed |  | 30 | rpm |
| Fan Power | 200 | 50 | w |
| Motor Power Per Disk |  | 1.5 | w/disk |
| Disk Motor Power | 0 | 75 | w |
| Total Condenser Power | 200 | 125 | w |
| Compressor Power | 1960 | 1230 | w |
| Compressor Capacity | 24700 | 24700 | Btu/hr |
| Indoor Fan Power | 330 | 330 | w |
| Net System Capacity | 23700 | 23700 | Btu/hr |
| Total System Power | 2490 | 1685 | w |
| System EER | 9.5 | 14.1 | Btu/hr/w |
| Percent Energy Saved |  | 32% |  |

The disks 24 are preferably fabricated of a plastic sheet or plastic-coated metal sheet.

Several different materials for the disks were examined in experiments and little variation was found in heat transfer. Theoretically a high-mass, high-conductivity material should give better heat transfer, but the observed effects of change of disk material were small. The primary factor in Thus, the present invention provides a sprayless apparatus that solves the problems associated with current evaporative condensers. Because the apparatus has no spray and little or no splashing, it greatly reduces or eliminates the risk of Legionnaire's disease. The elimination of the pump and spray system also avoids the clogging and freezing problems of the prior art systems.

Figure 1:
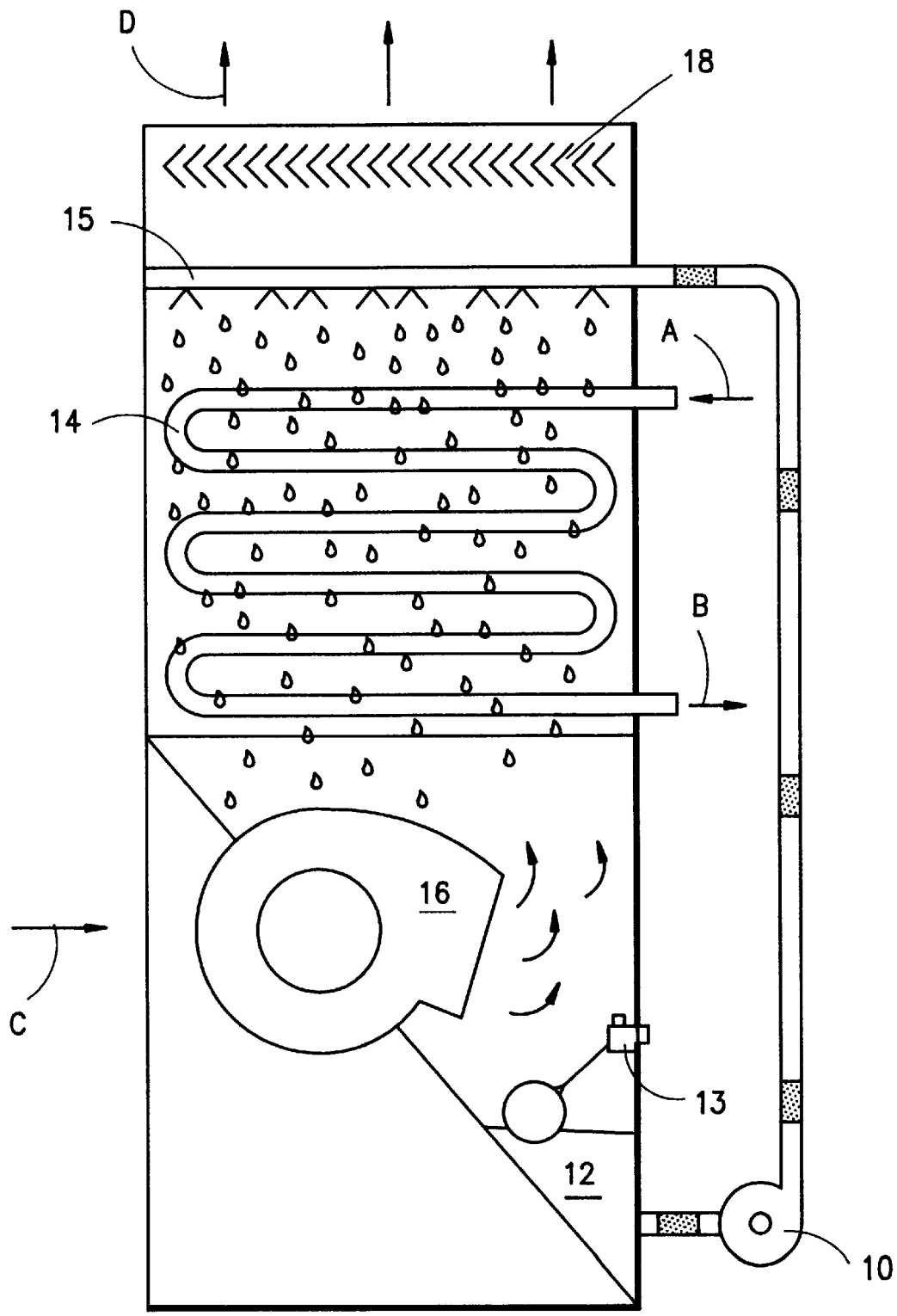
FIG. 1 is a schematic diagram of a prior art blow-through type evaporative condenser.

The condenser of the present invention requires only simple controls. A liquid level switch such as shown at 13 in FIG. 1 is provided to activate a solenoid valve on a make-up water line to maintain the proper water level in the tank. This valve could be located indoors to eliminate potential freezing problems. A second valve 34 can be used periodically to drain the tank to allow it to dry out and reduce problems with biological fouling.

Costs for the evaporative condenser of the present invention should be competitive with air-cooled equipment. It is estimated that the energy savings can pay back the extra initial cost of this system in roughly 2.5 years in a warm climate.

The evaporative cooler of the present invention offers a significant savings in peak demand. For a 36,000 Btu/hr system, the savings amount to more than 1 kW for typical conditions in the eastern U.S. (95 F. dry bulb, 75 F. wet bulb). The value of electric generating and transmission capacity is roughly $500 to $1000/kW. These cost savings to the utility would more than offset the additional cost of the system. Peak savings in the western U.S. would be even larger because the drier climate gives evaporative cooling an even greater advantage.

To illustrate how dry climates could improve performance, consider a comparison for Phoenix, Ariz. The design temperature is 109° F. with a wet-bulb temperature of 71° F. In the Phoenix desert climate the wet bulb temperature is almost 40° F. cooler than the dry bulb temperature, as opposed to roughly 20° F. for the eastern U.S. Energy savings in Phoenix could approach 50% compared with a conventional air-cooled system.

One potential advantage of the evaporative condenser of the present invention is the thermal mass associated with the water in the tank. The fan and disk can be run to cool the tank during the compressor off-time. For a three-ton system the mass of water in the tank would be roughly 500 pounds. Cooling the tank by 5 degrees Fahrenheit would store 2500 Btu of energy. This cooling corresponds to the total heat rejection for roughly four minutes of compressor operation. A compressor cycle typically lasts only 10 minutes, so this energy storage could significantly lower the average condensing temperature and thus improve system efficiency. A variable-speed or two-speed fan and disks would greatly reduce the auxiliary power requirements for cooling the tank during the off cycle and save additional energy.

To prevent biological growth in the tank, the tank should be drained frequently and allowed to dry completely. Another possibility is use of a biocide in the make-up water to kill any biological growth. Baltimore Aircoil, a cooling-tower manufacturer, sells a system that uses iodine as a biocide for small cooling towers. An advantage of iodine is that only a pound or two of material would be required for the entire life of the condenser, which means that the unit can be shipped with a lifetime supply.

EXPERIMENTAL

Figure 5:
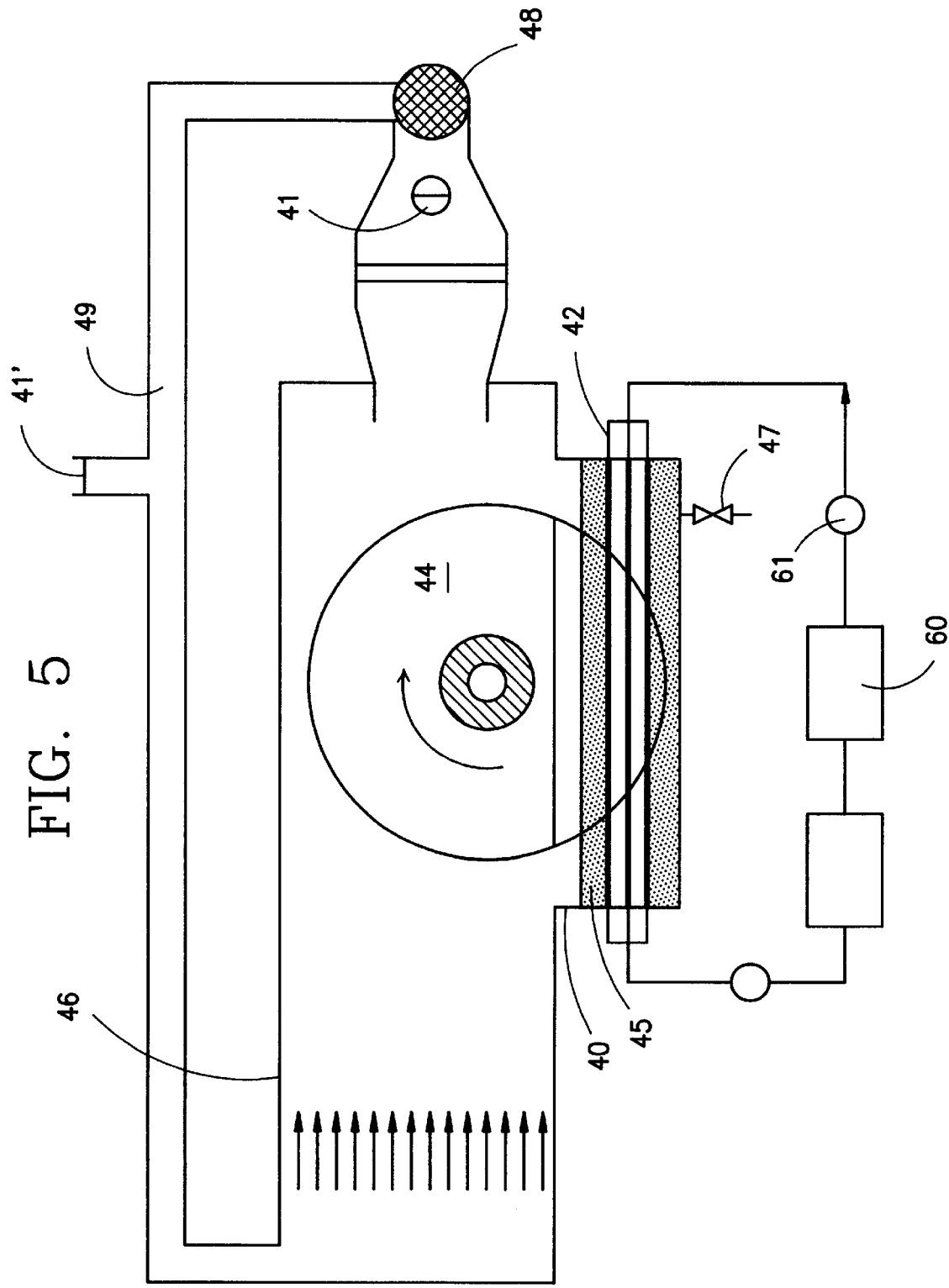
FIG. 5 is a schematic illustration of a bench-scale apparatus in accordance with the present invention.

A series of experiments were conducted using a bench-scale evaporative condenser as shown in FIG. 5, in accordance with the present invention. The bench top design had two disks 44 which were approximately half exposed to a stream of ambient air and approximately half submerged in a water pool containing condenser tubing 42. When the disks 44 are rotated, they bring the pool water into the air stream as a thin film. The flow of air past the wet disks 44 evaporates some of the water film on the disks and the cooled water falls back into the pool. Thus, rotation of the disks 44 serves dual purposes. First, it causes forced convection in the pool around the condenser 42 tubing which enhances the heat transfer from the condenser tubing to the water pool. Secondly, it takes the relatively warmer pool water into the air steam whereby the condenser heat is eventually rejected into the air.

The bench-scale parallel row evaporative condenser consists of a water pool 45, tube bundle 42, air channel 46, and stirring disks 44 as shown in FIG. 5. The apparatus utilized cooling caused by evaporation to achieve refrigerant condensation. The water tank 40 was fabricated of a 6.4 mm (¼ in) thick acrylic sheet with outside dimensions of 671 mm×259 mm×71 mm (26.4 in×10.2 in×2.8 in). Three rows of 7.9 mm (5/16 in) I.D. and 9.5 mm (⅜ in) O.D. copper tube 42 were arranged to pass horizontally through the tank length, with three tubes (in vertical column) per row. The vertical distance between the rows was 47 mm (1.85 in), while the horizontal spacing was 16 mm (0.63 in). The tank 40 was filled with water to a level 85 mm (3.35 in) above the top of the tube bundle. Reinforced acrylic rims of 37 mm (1.46 in) width and 13 mm (½ in) thickness at the tank top served as a mating surface for the air channel and as reinforcement for the tank 40. One side of the tank 40 is provided with a copper tube at the bottom, connected to a valve 47 to drain the tank when desired.

Another acrylic box 42 was used to house the stirring disks 44 and to direct the air flow from a blower 48 past the disks 44. Its outside dimensions were 1021 mm×419 mm×71 mm (40.2 in×16.5 in×2.8 in), and it was also 6.4 mm (¼ in) thick. Rims similar to those on the water tank were provided for fastening the air channel to the tank. The inlet section was completely open, and the outlet was restricted to a 127 mm×57 mm (5.0 in×2.25 in) central opening.

The critical components of the condenser are the stirring disks 44. Aluminum and various plastics such as polypropylene and styrene were tested as disk materials. The disks 44 are partially immersed in the water pool, with 30–50w, preferably about 40%, of their surface area being submerged, and with the disks 44 rotating between the rows of tubes 42. An acrylic shaft and hard copper tube serve to connect the disks 44 and bushing to the motor (not shown). The aluminum disks 44 had a diameter of 610 mm (24.0 in), and a thickness of 1.6 mm (0.063 in) with a bore of 7.6 mm (0.3 in) for connecting the disks 44 to the driving motor. Between each pair of adjacent disks 44 were a 102 mm (4.0 in) plastic bushing with the same bore, as well as acrylic spacers with a radius of 156 mm (6.1 in), which combined to maintain the 16 mm (0.63 in) spacing between the disks 44. A constant water level device was used to maintain of a constant water pool level during testing to ensure a constant thermal capacity for the pool and true steady-state conditions.

In order to control the inlet wet-bulb temperature, an air recirculation duct 49 was used between the inlet and outlet cross-sections. The fan outlet, located after the air duct outlet, was connected to a 152 mm (6.0 in) diameter flexible duct which is connected to the air duct inlet. To control the inlet wet-bulb, a damper 41 was placed between the air duct outlet and the blower 48 inlet to control the amount of fresh air. Since air was added to the system here, a second damper 41' was added in the middle of the duct for venting.

Hot water was used to simulate a condensing refrigerant. A constant temperature bath 60 was used to maintain a constant inlet water temperature and was contained in an insulated box with a 1000 Watt (3.412 Btu/h) electric heater and a temperature control probe. A 250 W (⅓ hp) centrifugal pump 61 was used to circulate the water through the refrigerant loop. The pump speed was varied via a 2.8 kVA auto-transformer. The air flow was provided by a 12V DC centrifugal blower 48 which was powered by a DC power supply connected in series with a 1.4 kVA auto-transformer, allowing for variable air flow rate.

The disks 44 in this parallel flow configuration were rotated with a 125 W (⅙ hp) motor. The motor shaft was attached to the disk shaft by a universal joint which corrected for any misalignment of the two shafts. The motor was connected to a compatible motor controller, which allowed for speed adjustment from 0 rpm to the rated 1800 rpm.

The key flow rates for determining the condenser's performance are the water and air volume flow rates. A turbine flow meter was used to measure the water flow rate. Air flow rate was measured by a differential pressure transducer measuring the pressure drop across the flow nozzle via two pressure taps. Depending upon the air flow rate, either a 38 mm (1.5 in) throat diameter or a 76 mm (3.0 in) throat diameter nozzle was used. This pressure drop is then used to calculate the air volume flow rate.

For all temperature measurements, T-type (copper-constantan) thermocouples were used. The inlet and outlet air humidity was measured using two humidity/temperature transmitters. A Hewlett-Packard HP3497A Data Acquisition/Control Unit was used for measuring the voltage outputs of the various measurement devices.

The data collected for each test included condenser water inlet and outlet temperatures; air inlet and outlet temperatures; air inlet and outlet relative humidities; condenser water volume flow rate; air volume flow rate; water pool temperature; temperature of the mid-point of the condenser tubing; disk temperature; disk angular velocity; and volume of water consumed.

Effect of Disk Angular Velocity

Figure 6:
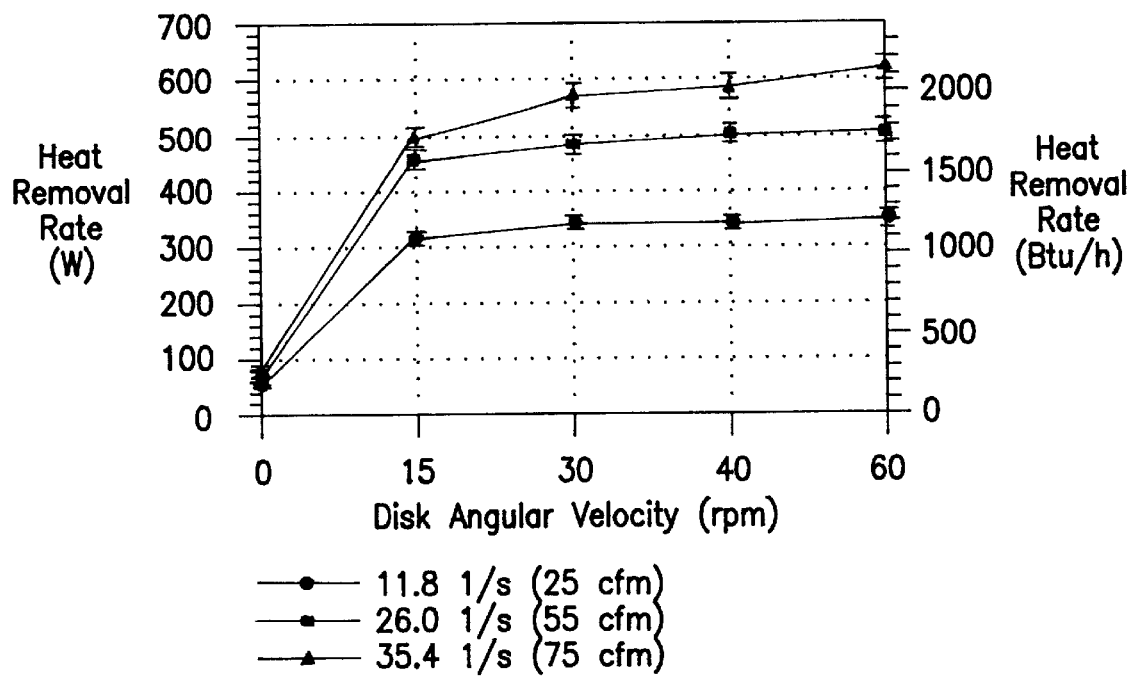
FIG. 6 is a graph of heat removal rate (W) versus disk angular velocity (RPM) obtained in series of tests using the apparatus depicted in FIG. 5.
Figure 7:
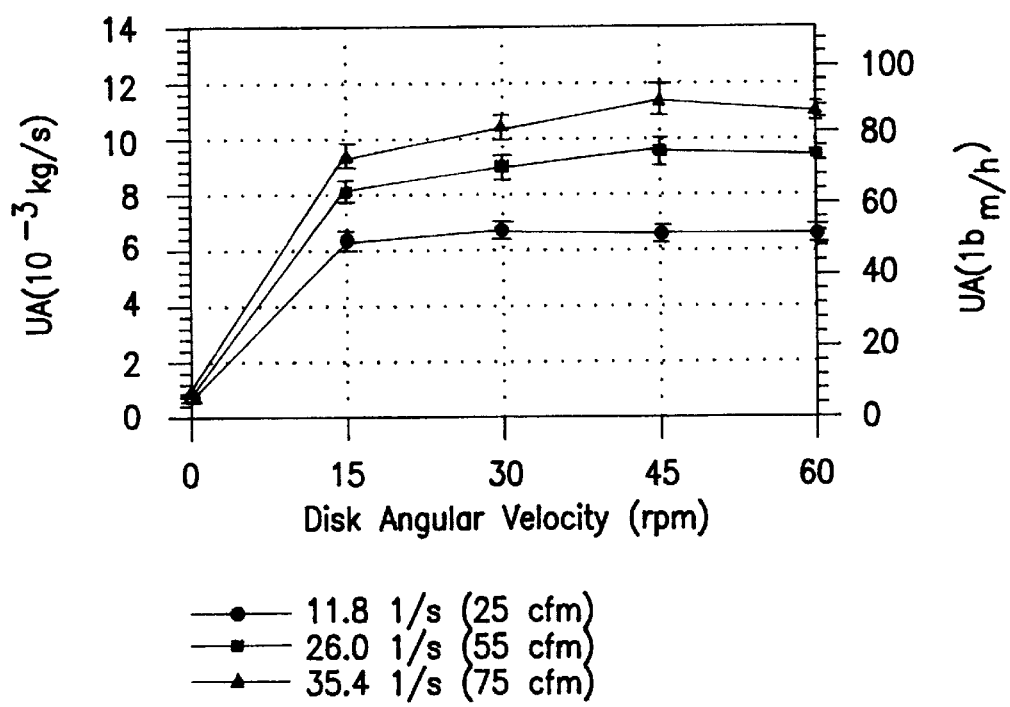
FIG. 7 is a graph of overall heat removal rate (UA) ($10^{-3}$Kg/s)
Figure 8:
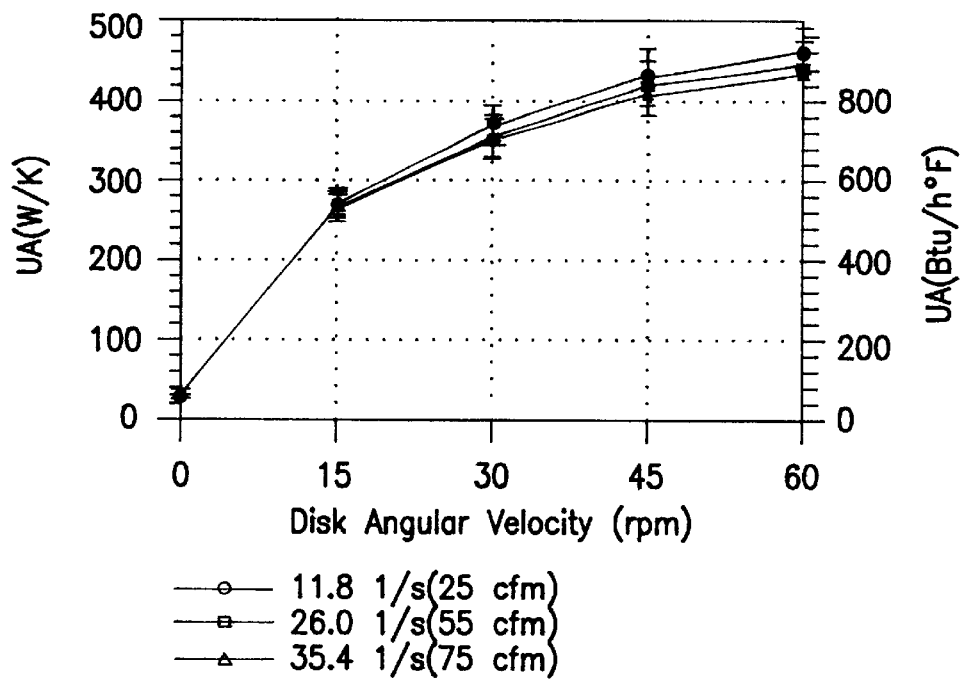
FIG. 8 is a graph of water side UA (in W/K and BTU/h-°F.) versus disk angular velocity in the series of tests.

The effect of the disk angular velocity on heat removal at various air flow rates is shown in FIG. 6. FIG. 6 shows that the heat removal rate increases quickly from 0 to 15 rpm but becomes nearly asymptotic beyond 30 rpm. FIGS. 7 and 8 show the effect of disk angular velocity on the overall and water-side UA values, respectively The enthalpy-driven UA shows the same asymptotic trend as the heat removal rate. Since the enthalpy difference between the inlet air and the inlet water remains fairly constant for these tests, the UA mirrors the heat removal rate. The water side UA shows a significant increase as angular velocity increases, but the rate of the increase decreases as rpm increases. This effect is expected since the water pool becomes more turbulent at higher rpm. Also, the air flow rate has no effect on this UA value, as the figure demonstrates.

Effect of Air Flow Rate

Figure 9:
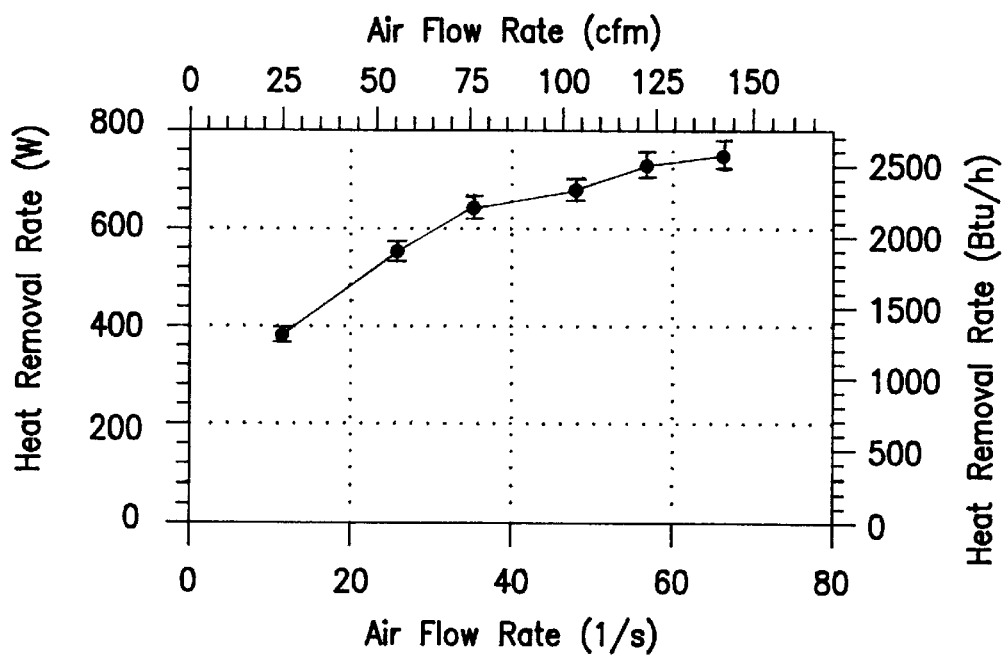
FIG. 9 is a graph of heat removal rate (W) versus air flow rate (in 1/s and cfm) in the series of tests.

FIG. 9 shows the effect of air flow rate on the condenser capacity. As flow rate increases, the heat removal rate increases accordingly. The increased heat removal capabilities of higher flow rates decrease the outlet temperature of the condenser water. The temperature of the water on the disks is limited by the wet-bulb of the entering air, and as the condenser outlet temperature decreases, the effective temperature and enthalpy differences diminish. This makes further improvements increasingly difficult and may cause the decreasing slope.

Effect of Disk Material

Figure 10:
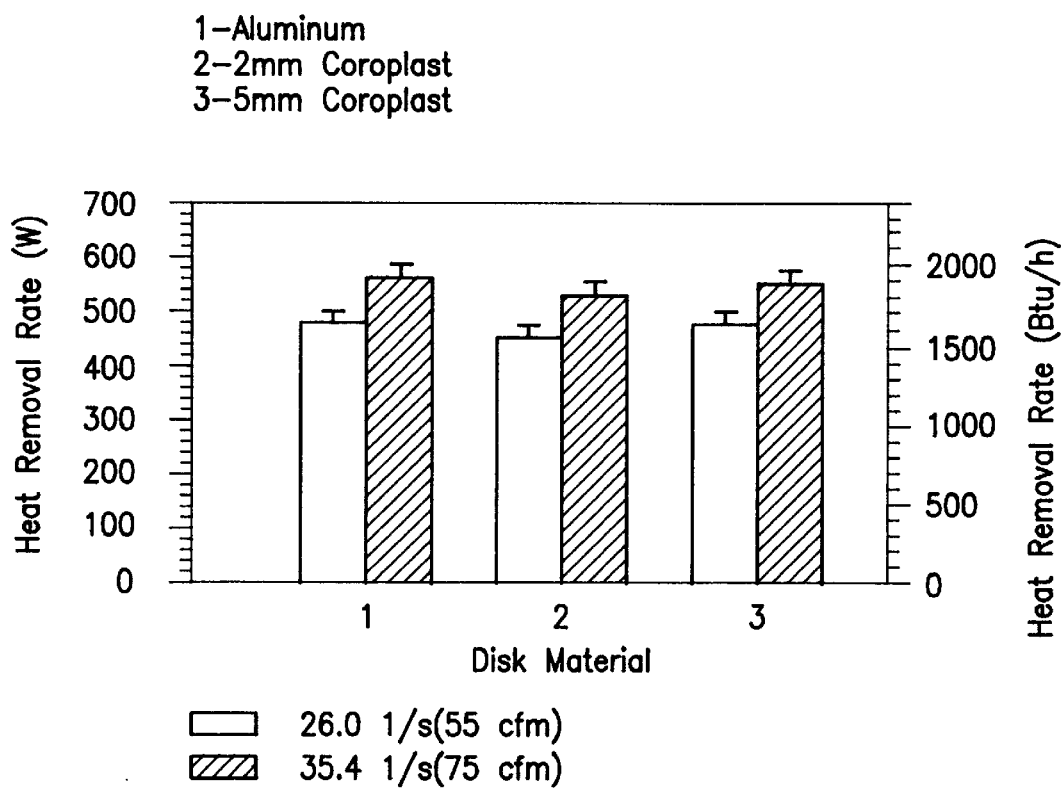
FIG. 10 is a bar graph of heat removal rate for three different disks.

FIG. 10 shows the effect of different disk materials on the heat removal rate. The Coroplast™ material is a twin wall, fluted polypropylene material. The Coroplast sheets in 2 mm (0.08 in) and 5 mm (0.2 in) thickness were used as the disk material. As FIG. 13 shows, the aluminum disks do have a higher heat removal rate, but the deviation is not deemed to be statistically significant.

The data in FIG. 10 shows that the disk material has only a small effect on the heat removal rate of the system. This suggests that the water film is the primary heat carrier. Two calculations verify this. First, the temperature of the disk changes by no more than 0.05° C. (0.1° F.) from where it exits the water pool to the point of re-entry, as measured by a thermocouple on the disk. The total heat capacity of the aluminum disks in the apparatus is 2203 J/K (1.16 Btu/°F.). At 30 rpm, the disks make 0.5 revolutions in one second (corresponding to two thermocouple readings per revolution), meaning that they can gain and lose their full heat capacity in two seconds. With a maximum temperature change of 0.05° C. (0.1° F.), this results in 55 W (188 Btu/h). This is approximately 11% of the heat removal rate at 30 rpm, which is congruous with the marginal effects of changing disk materials noted experimentally.

The second calculation is based on the premise that the water must carry the heat if the disks do not. A hydrodynamic analysis by Landau and Levich as described in Probstein [1989] was used to estimate the water film thickness. The analysis accounts for the surface tension, viscous, and gravity forces in the development of the liquid film on a vertical sheet that is being dragged out of a liquid pool. In the apparatus, the disks are wetted from a radius of 50.8 mm (2.0 in) to the outer radius of 305 mm (12.0 in). Calculations showed that at these locations, the value of film thickness is 0.0368 mm (1.45×10-3 in) and 0.121 mm (4.76×1 d in), respectively. With an average film thickness of 0.083 mm (3.27×10-3 in), the total volume of water on the part of the disks in air is 51.8×103 mm3 (3.16 in3), and the total heat capacity is approximately 216 J/K (0.114 Btu/°F.). If we assume that the water leaves the pool at the temperature of the pool and enters the pool at the wet-bulb temperature of the exiting air, the temperature change is approximately 5° C. (9° F.). This means that the water film transfers 540 W (1843 Btu/h) of heat. This is quite close to the actual values measured. It is crucial to note the considerably larger temperature change of the water film as compared to the disks. Along with the data, these two analyses show that the water film, and not the disks, is the primary heat transfer medium.

Figure 11:
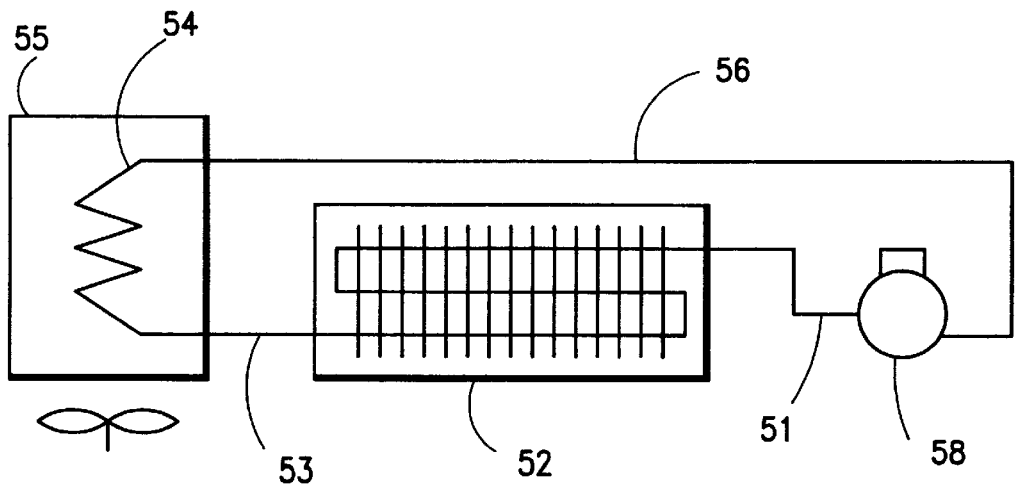
FIG. 11 is a schematic view of a refrigeration system utilizing the evaporative condenser of the present invention.

FIG. 11 shows a preferred use of the evaporative cooler of the present invention in an otherwise conventional refrigeration system. In FIG. 11, a compressor 50 supplies a refrigerant through line 51 to an evaporative cooler 52 in accordance with the present invention, here serving as a condenser, wherein refrigerant vapor is condensed. Exiting the evaporative cooler (condenser) 52, the liquefied refrigerant is fed through line 53 to an evaporator 54 wherein at least a portion of the refrigerant is vaporized thereby cooling a compartment 55 housing evaporator 54. The refrigerant vapor is then returned to the compressor 50 through line 56.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. An evaporative cooler comprising:
   a tank containing a pool of a liquid coolant with an upper surface of the pool in contact with air;

a rotatable shaft having a longitudinal axis approximately parallel to the upper surface of the pool;

means for rotating said shaft; and plural rows of runs of tubes mounted within said tank and traversing said tank between opposing sides thereof, below the upper surface of the pool of liquid coolant, said rows of tubes being spaced apart to define lanes therebetween;

plural circular disks mounted on and radially extending from said rotatable shaft, said plural circular disks being spaced along said rotatable shaft at positions corresponding to said lanes and extending down into said pool between said parallel rows, each of said circular disks entering the pool, exiting the pool into the air space and exiting the air to reenter the pool continuously, in a repeating cycle, as said shaft is rotated, whereby liquid coolant from the pool clinging to said circular disks is evaporated into the air upon entering the air, cooling said circular disks and remaining adherent liquid coolant, said cooled circular disks and remaining adherent liquid coolant cooling the pool upon reentry.

2. The evaporative cooler of claim 1 further comprising: a fan for blowing an air stream across portions of said circular disks exposed to the air.

3. The evaporative cooler of claim 2 further comprising a tank holding said pool of liquid coolant and defining an enclosed air space above the upper surface of said liquid pool through which said air stream is moved by said fan.

4. The evaporative cooler of claim 3 further comprising at least one heat exchange member in contact with said liquid coolant and containing a heat exchange medium to be cooled.

5. The evaporative cooler of claim 1 wherein each of said rows is formed of a single tube bent to provide plural horizontal runs vertically arranged.

6. The evaporative cooler of claim 1 wherein said circular disks are corrugated.

7. The evaporative cooler of claim 1 wherein less than 50% of the surface area of each of the circular disks is submerged in the bath.

8. The evaporative cooler of claim 1 wherein 30–50% of the diameter of each of the circular disks is submerged in the bath.

9. A refrigeration unit comprising:

an evaporative condenser, said evaporative condenser comprising:

a tank containing a pool of a liquid coolant, with an upper surface of the pool in contact with air;

a rotatable shaft having a longitudinal axis approximately parallel to the upper surface of the pool;

plural rows of runs of tubes mounted within said tank and traversing said tank between opposing sides thereof, below the upper surface of the pool of liquid coolant, said rows of tubes being spaced apart to define lanes therebetween;

plural circular disks mounted on and radially extending from said rotatable shaft, partially submerged within the liquid coolant between said parallel rows and extending into the air above the liquid coolant for evaporation of adhering liquid coolant therefrom, whereby the liquid coolant is cooled as said circular disks reenter the liquid coolant;

a compressor for feeding the refrigerant, at least partially in a vapor state, to said condenser; and an evaporator mounted within a compartment for receiving liquefied refrigerant exiting said condenser and thereby cooling said compartment.

10. The refrigeration unit of claim 9 wherein said evaporative condenser further comprises a fan for blowing an air stream across the upper surface of the pool of liquid coolant.

11. The refrigeration unit of claim 10 wherein said evaporative condenser further comprises a tank holding said pool of liquid coolant and defining an enclosed air space above the upper surface of said liquid pool through which said air stream is moved by said fan.

12. The refrigeration unit of claim 9 wherein each of said rows is formed of a single tube bent to provide plural horizontal runs vertically arranged.

13. The refrigeration unit of claim 9 wherein said circular disks are corrugated.

14. The refrigeration unit of claim 9 wherein 30–50% of the diameter of each of the circular disks is submerged in the bath.

15. A method for evaporative cooling of a fluid comprising:

providing a tank holding a pool of liquid coolant with parallel rows of runs of tubes, submerged in the pool and traversing the tank by extending between opposing sides thereof, for passing the fluid to be cooled therethrough in a heat exchange relationship with the liquid coolant contained in the tank, and a plurality of circular disks partially submerged within the liquid coolant between said rows and extending into an air space above the liquid coolant;

passing a stream of air over portions of the circular disks extending into the air space for evaporation of liquid coolant from the surfaces of the circular disks; and continuously rotating the circular disks so that a major portion of the surface area of the circular disks is alternately submerged in the liquid coolant and exposed to said air stream, whereby evaporation of liquid coolant adhering to exposed portions of the circular disks in contact with said air stream is evaporated therefrom and the liquid coolant is thereby cooled upon reentry of the exposed surface portions the pool of liquid coolant.

* * * * *